(12) United States Patent (10) Patent No.: US 9,051,190 B2
Genin et al. (45) Date of Patent: Jun. 9, 2015

(54) USE OF AN OXYHYDROXY SALT RELATED TO THE FAMILY OF LAMELLAR DOUBLE HYDROXIDES FOR THE DESIGN AND MANUFACTURE OF AN ELECTRODE WITH A VIEW TO STORING ELECTRICAL ENERGY

(75) Inventors: Jean-Marie Genin, Neuviller sur Moselle (FR); Christian Ruby, Tomblaine (FR)

(73) Assignee: UNIVERSITE HENRI POINCARE NANCY 1, Nancy (FR)

( * ) Notice: Subject to any disclaimer, the term of this patent is extended or adjusted under 35 U.S.C. 154(b) by 1166 days.

(21) Appl. No.: 13/056,769

(22) PCT Filed: Jul. 28, 2009

(86) PCT No.: PCT/FR2009/051514
§ 371 (c)(1),
(2), (4) Date: Mar. 25, 2011

(87) PCT Pub. No.: WO2010/012951
PCT Pub. Date: Feb. 4, 2010

(65) Prior Publication Data
US 2011/0183201 A1 Jul. 28, 2011

(30) Foreign Application Priority Data
Jul. 29, 2008 (FR) .................................. 08 04325

(51) Int. Cl.
*C01G 49/00* (2006.01)
*C01G 49/02* (2006.01)
(Continued)

(52) U.S. Cl.
CPC ..... *C01G 49/0018* (2013.01); *Y10T 428/24612* (2015.01); *C01G 49/009* (2013.01); *C01G 49/02* (2013.01); *C01G 51/006* (2013.01); *C01G 53/006* (2013.01); *C01P 2002/22* (2013.01); *C01P 2006/40* (2013.01); *C09C 1/42* (2013.01); *H01G 11/86* (2013.01); *H01M 4/52* (2013.01); *H01M 10/36* (2013.01); *Y02E 60/13* (2013.01); *H01G 11/30* (2013.01); *H01G 11/48* (2013.01); *H01G 11/50* (2013.01)

(58) Field of Classification Search
USPC .............. 429/221, 231.4, 212, 217, 233, 188, 429/204
See application file for complete search history.

(56) References Cited

U.S. PATENT DOCUMENTS 4,118,294 A 10/1978 Pellegri
6,916,578 B2 * 7/2005 Funabiki et al. ........... 429/231.1

FOREIGN PATENT DOCUMENTS

EP 1903628 3/2008
JP 2005183032 7/2005

OTHER PUBLICATIONS

Bousselmi et al., "Impedance Spectroscopic Study of a Steel Electrode in Condition of Scaling and Corrosion-Interphase Model", Electrochimica Acta, Jul. 31, 1999, pp. 4357-4363, vol. 44, No. 24, Elsevier Science Publishers, Barking, GB, XP004173514.

(Continued)

*Primary Examiner* — Patrick Ryan
*Assistant Examiner* — Julian Anthony
(74) *Attorney, Agent, or Firm* — Young & Thompson

(57) ABSTRACT

The present invention relates to the use of an oxyhydroxy salt related to the family of layered double hydroxides for the design and manufacture of an electrode with a view to storing electrical energy.

31 Claims, 8 Drawing Sheets

(51) Int. Cl.
    *C01G 51/00* (2006.01)
    *C01G 53/00* (2006.01)
    *C09C 1/42* (2006.01)
    *H01G 11/86* (2013.01)
    *H01M 4/52* (2010.01)
    *H01G 11/30* (2013.01)
    *H01G 11/48* (2013.01)
    *H01G 11/50* (2013.01)
    *H01M 10/36* (2010.01)

(56) References Cited

OTHER PUBLICATIONS

Genin et al., "Fougerite and -Fe<II-III> hydroxycarbonate green rust; orgering, deprotonation and/or cation substitution; structure of hydrotalcite-like compounds and mythic ferrosic hydroxide Fe(OH)(2+x)", Solid State Sciences, May 1, 2005, pp. 545-572, vol. 7, No. 5, Elsevier, Paris, FR, XP025368639.

Ruby et al., "In Situ Redox Flexibility of Fe<II-III> Oxyhydroxycarbonate Green Rust and Fougerite", Environmental Science and Technology, Aug. 1, 2006, pp. 4696-4702, vol. 40, No. 15, American Chemical Society. Easton, PA, USA, XP002454437.

Benoit et al., "Chemistry and electrochemistry of nanostructured iron oxyhydroxides as lithium intercalation compounds for energy storage", Journal of Physics and Chemistry of Solids, May 1, 2006, pp. 1265-1269, vol. 67, No. 5-6, Pergamon Press, London, GB, XP025189308.

Hang et al., "The electrochemical properties of Fe2O3-loaded carbon electrodes for iron-air battery anodes", Journal of Power Sources, Oct. 4, 2005, pp. 261-271, vol. 150, Elsevier SA, CH, XP025269172.

International Search Report dated Jun. 14, 2010 from PCT/FR2009/051514.

FR Search Report dated Mar. 25, 2009 from corresponding FR0804325.

\* cited by examiner

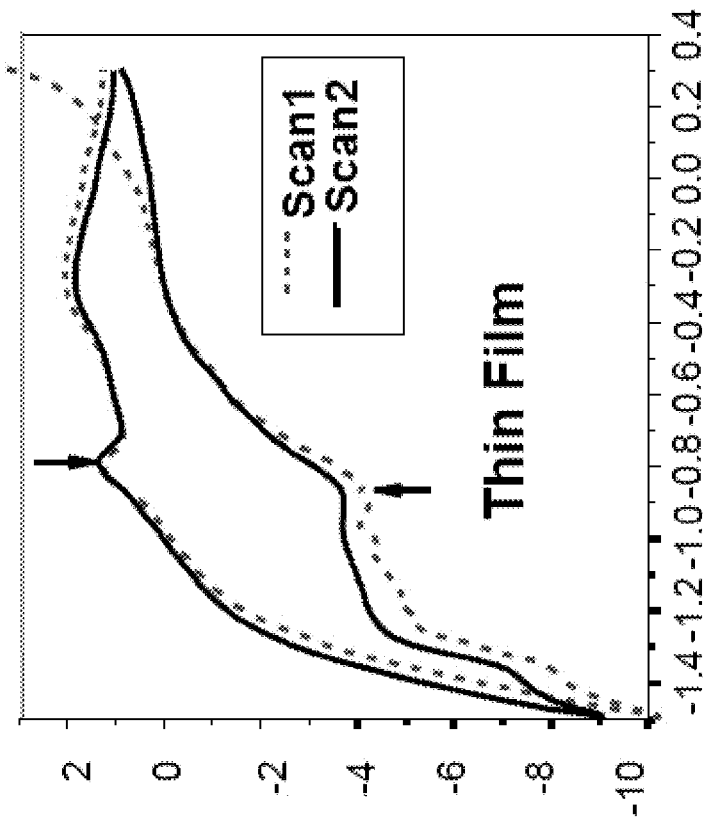
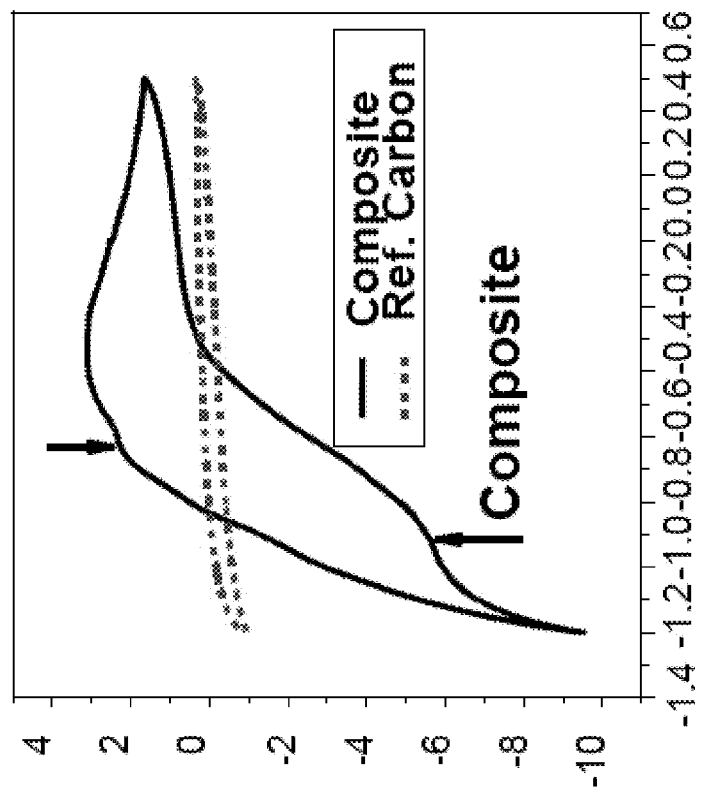
Figure 4B
Figure 4A

USE OF AN OXYHYDROXY SALT RELATED TO THE FAMILY OF LAMELLAR DOUBLE HYDROXIDES FOR THE DESIGN AND MANUFACTURE OF AN ELECTRODE WITH A VIEW TO STORING ELECTRICAL ENERGY

The present invention relates to the use of an oxyhydroxy salt related to the family of layered double hydroxides for the design and manufacture of an electrode with a view to storing electrical energy.

The ferrous-ferric oxyhydroxy salts are intermediate compounds, related to the family of layered double hydroxides, which appear during degradation of ferrous materials (steels) and ultimately are converted to rust and thus are commonly called green rusts because of their colour (Génin et al., Geoscience 2006).

For example, Ona Nguema et al., 2002, Enviro. Sci. Technol., described the formation of green rusts by the dissimilatory iron reducing bacteria *Shewanella putrefaciens* in the presence of formate ($HCO_2^-$) as electron donor and of lepidocrocite, iron oxide hydroxide γ-FeOOH, as electron acceptor, a source of iron. The bacterial activity then consists of reducing the $Fe^{III}$ ions to $Fe^{II}$ while oxidizing the organic matter to carbonate $CO_3^{2-}$, which then allows the so-called carbonated green rust to form. This product is therefore a natural product that occurs in particular in waterlogged soils, gleys, and is known as fougerite (cf. Génin et al. Geochim. Cosmochim. Acta 1998).

Moreover, in devices for storing electrical energy, such as cells, batteries or accumulators, a chemical reaction takes place between two substances, one of which can easily give up electrons (the reducing agent), and the other can accept them (the oxidizing agent). This is called a redox (reduction-oxidation) reaction.

Each element of the oxidizing/reducing couple constitutes an electrode. These electrodes, when connected to a device that consumes electricity, cause current to circulate; for its part, therefore, the chemical reaction produces a circulation of charges (electrons, ions).

Recently, interest in energy storage devices has increased considerably because of problems connected with the need to reduce emissions of greenhouse gases (in particular $CO_2$) and accordingly find means for the production and use of energy that are less polluting, not forgetting the limitation of fossil fuel reserves (petroleum, natural gas, coal) and uncertainties regarding their supply.

However, existing cells, batteries or accumulators have drawbacks in terms of energy performance often due to their weight or their bulkiness, not forgetting the environmental problems, in particular connected with polluting waste that requires precautions during recycling.

One of the subjects of the invention is therefore to provide a material for the manufacture of an electrode with a view to employing energy storage devices such as electric cells, batteries, accumulators or supercapacitors having energy performance far superior to the cells, batteries, accumulators or supercapacitors currently marketed, while having a much lower production cost than the existing materials and that can be disposed of without any harmful effect on the environment.

Another aspect of the invention is to develop these active materials with the composition that is well established, providing a method of manufacture either in the form of film or of composite material mixed with carbon (graphite) thus permitting the manufacture of the energy storage devices.

The present invention relates to the use of a material comprising at least one compound related to a ferrous-ferric layered double hydroxide (LDH), said compound having at least one divalent cation $D^{II}$, and at least one trivalent cation $T^{III}$, of the following general formula:

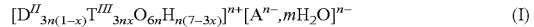
$$[D^{II}_{3n(1-x)}T^{III}_{3nx}O_{6n}H_{n(7-3x)}]^{n+}[A^{n-},mH_2O]^{n-} \qquad (I)$$

in which $A^{n-}$ is an anion of charge n, n having the values 1, 2 or 3, in particular 2, m is an integer in the range from 1 to 10, in particular from 1 to 4, advantageously 3, and x is from 0 to 1, for implementing an electrode.

The expression "at least one divalent cation $D^{II}$" signifies that the cation $D^{II}$ is used alone or in combination with another.

The expression "at least one trivalent cation $T^{III}$" signifies that the cation $T^{III}$ is used alone or in combination with another.

In order to function, the compound related to the LDH requires the presence of a minimum proportion of $Fe^{II}$ of 1%, permitting conversion of an $Fe^{II}$ ion to an $Fe^{III}$ ion. If the compound related to LDH does not have any $Fe^{II}$, then it is non-functional.

The invention relates more particularly to the use of a compound as defined above, in which the proportion of $Fe^{III}$ in the trivalent element is from 0% (w/w) to 100% (w/w) relative to the total amount of trivalent element.

The presence of $Fe^{III}$ is not indispensable, provided that $Fe^{II}$, which can be converted to $Fe^{III}$, is present in the compound.

The invention also relates to the use of a compound related to LDH as defined above, in which $D^{II}$ is selected from $Mg^{II}$, $Ni^{II}$, $Ca^{II}$, $Mn^{II}$, $Co^{II}$ and $Fe^{II}$, and $T^{III}$ is selected from $Al^{III}$, $Co^{III}$, $Cr^{III}$ and $Fe^{III}$.

The present invention relates to the use of a material comprising at least one ferrous-ferric oxyhydroxy salt of the following general formula (II):

$$[Fe^{II}_{3n(1-x)}Fe^{III}_{3nx}O_{6n}H_{n(7-3x)}]^{n+}[A^{n-},mH_2O]^{n-} \qquad (II)$$

in which $A^{n-}$ is an anion of charge n, n having the values 1, 2 or 3, in particular 2, m is an integer in the range from 1 to 10, in particular from 1 to 4, advantageously 3, and x is from 0 to 1, said ferrous-ferric oxyhydroxy salt can be modified partially by the partial or complete replacement of at least one of its elements for implementing a non-polluting electrode.

The ferrous-ferric hydroxy salts belong to the family of layered double hydroxides that have cationic lamellae comprising $Fe^{II}$ and $Fe^{III}$ ions of structure $Fe(OH)_2$, called brucitic, and interlamellae comprising anions and water molecules, which counterbalance the excess of positive charges due to the $Fe^{III}$ ions.

For their part, the ferrous-ferric oxyhydroxy salts have a crystallographic structure similar in practice to that of the related hydroxy salts, but some of their $OH^-$ ions that surround each $Fe^{III}$ cation are deprotonated, becoming $O_2^-$ ions or, conversely, protonated, becoming water molecules. $Fe^{II}$ ions are oxidized to $Fe^{III}$ to compensate the charge, and vice versa.

The ferrous-ferric oxyhydroxy salts used within the scope of the invention can be of natural origin or synthetic, the latter being preferred.

The ferrous-ferric oxyhydroxy salts are observed in the natural state in soils but are only present in a range of $x=[Fe^{III}]/[Fe_{total}]$ from 0.33 to 0.66 in the present state of knowledge. It is then the mineral fougerite. In contrast, the synthetic products correspond to values of x from 0 to 1, owing to suitable electronic properties that are novel.

"0.33" denotes the exact value ⅓.

"0.66" denotes the exact value ⅔.

The value of x within the ferrous-ferric oxyhydroxy salt corresponds to the ratio $Fe^{III}/(Fe^{II}+Fe^{III})$ and can be measured directly in situ by Mössbauer spectrometry in the solid.

The crystallographic structure of the ferrous-ferric oxyhydroxy salts, and more particularly that of the oxyhydroxycarbonate, has been described in detail by Génin et al. (CR Geoscience, 2006).

The three ranges of x from 0 to 0.33, 0.33 to 0.66 and 0.66 to 1 have been elucidated (Génin et al., Solid State Sciences, 2006 and Rush et al., Solid State Science, 2008).

FIGS. 2 a-j present the variation of the Mössbauer spectra measured at 78 K of samples of ferrous-ferric oxyhydroxycarbonate with different proportions of x, showing the gradual disappearance of $Fe^{II}$ as it is converted to $Fe^{III}$. The ferrous doublets, $D_1$ and $D_2$, are transferred to the ferric doublet $D_4$. FIGS. 2 a, c, e, g, i represent the respective deconvolutions of the spectra in FIGS. 2 b, d, f, h, j.

Thus, a value of x greater than 0.66 corresponds to a structure that would imply more energy to be able to be achieved under natural conditions, whereas there is preferential formation of magnetite, from $Fe_3O_4$ to $\gamma$-$Fe_2O_3$, with a spinel structure.

For values of x less than 0.33, the crystallographic structure is metastable. This crystallographic structure is obtained by voltamperometric cycling.

Voltamperometric cycling is a method in which the voltage of the solid is varied continuously and cyclically with a potentiometer.

The term "metastable" denotes a system that corresponds to a local energy minimum but where this minimum is not the lowest, leaving the term "stable" for the latter.

Passage of the solid from x=0.33 to x=1 is typically obtained continuously by gradual oxidation by hydrogen peroxide $H_2O_2$. It is a phenomenon of deprotonation within the compound, during which some $OH^-$ ions become $O_2^-$, correlatively converting $Fe^{II}$ ions to $Fe^{III}$.

In particular, passage of the solid from x=0.33 to x=1 can be obtained by immediate oxidation of the stoichiometric compound, the ferrous-ferric hydroxy salt (x=0.33) of formula $[Fe^{II}_{2n}Fe^{III}_n(OH)_{6n}]^{n+}[A^{n-},mH_2O]^{n-}$, by hydrogen peroxide $H_2O_2$ (n representing the charge of the anion).

Continuous deprotonation of ferrous-ferric oxyhydroxycarbonate was demonstrated for the first time by Génin et al., Solid State Science 2006. No other known oxide (whether or not comprising iron) possesses said phenomenon of continuous deprotonation and such a range for the ratio x.

The term anion denotes any ion of negative charge. Within the scope of the present invention, the anion has 1, 2 or 3 negative charges, and in particular 2 negative charges (for example the carbonate).

When x is equal to 0, the ferrous-ferric compound becomes simply the hydrated ferrous hydroxy salt of formula $[Fe^{II}_{3n}O_{6n}H_{7n}]^{\cdot n+}[A^{n-},mH_2O]^{\cdot n-}$. It is then a protonation, during which $OH^-$ becomes $H_2O$.

In particular, when the anion has two negative charges, the ferrous-ferric hydroxy salt becomes the hydrated ferrous hydroxy salt of formula $[Fe^{II}_6O_{12}H_{14}]^{2+}A^{2-}$.

When x is equal to 1, the ferrous-ferric hydroxy salt becomes simply the ferric oxyhydroxy salt of formula $[Fe^{III}_{3n}O_{6n}H_{4n}]^{n+}[A^{n-},mH_2O]^{n-}$.

In particular, when the anion has two negative charges, the ferric oxyhydroxy salt becomes the ferric oxyhydroxy salt of formula $[Fe^{III}_6O_{12}H_8]^{2+}A^{2-}$.

In the case when $A^{n-}$ corresponds to the carbonate, the totally ferric compound is designated GR* (or RV*), and this designation will be used in the rest of the description.

In a cell, battery or accumulator, each element of the oxidizing/reducing couple is connected to an electrode.

The ferrous-ferric oxyhydroxy salt according to the invention possesses redox properties that are entirely novel, permitting the constitution of an electrode (anode or cathode).

There are at present several technologies for manufacturing electrodes for energy storage, such as lead, nickel-cadmium, nickel-metal hydride, nickel-zinc, lithium-ion batteries etc.

All these technologies use electrodes that are more or less polluting, necessitating removing the metal present in the material prior to disposal of the product.

The expression "non-polluting" therefore denotes a material that does not possess a priori compounds or contaminants that can have a negative impact on all or part of an ecosystem or the environment in general.

Another advantage of the invention is therefore that there is no need to remove metal or to process the material prior to its disposal, and it thus makes a non-polluting electrode available.

In an advantageous embodiment, the invention relates to the use of the material defined above in which the theoretical specific electrical energy capacity of said electrode is greater than or equal to 160 Ah/kg, in particular 245 Ah/kg.

For example, in the case when $A^{n-}$ represents the carbonate, this theoretical capacity is 245 Ah/kg.

By the expression "theoretical specific electrical energy capacity" is meant the amount of electricity that the material can return relative to its mass.

One of the advantages of the material of the invention is that it possesses a specific electrical energy capacity that is about 50% greater than the specific electrical energy capacities observed to date in the commercially available materials in particular Li-ion and therefore possesses a potential power far greater than the known electrode materials.

By way of example, the materials marketed to date only reach 160 Ah/kg, for example $LiCoO_2$ (The 14$^{th}$ International Meeting on Lithium Batteries, Jun. 22-28, 2008, Tianjin, China).

In an advantageous embodiment, the theoretical electrical energy capacity of the electrode defined above is from about 160 Ah/kg to about 300 Ah/kg, preferably from 160 Ah/kg to 250 Ah/kg, even more preferably from 200 Ah/kg to 250 Ah/kg, and in particular 245 Ah/kg.

According to an advantageous embodiment, the material used, defined above, can be used in energy storage devices such as electric cells, batteries, accumulators or supercapacitors.

By the expression "energy storage device" is meant a device that can either only deliver the energy that it contains, resulting in a device that no longer possesses energy and cannot store energy again, or that can deliver the energy that it contains and can then be recharged with energy so as to be able to deliver it again.

By "cell" is meant an energy storage device that alters the chemical structure of its elements during operation but cannot restore them to their initial state. A cell therefore has a limited working life.

By "battery" is meant an energy storage device that chemically modifies the surface of its elements, which are immersed in an electrolyte, during operation, and which can then return to their initial state.

By "accumulator" is meant a device intended for storing electrical energy and which can return it subsequently.

By "supercapacitor" is meant a capacitor which makes it possible to obtain instantaneous power required for a variable duration.

Consequently, the material of the invention is capable of performing electrical charges and discharges of variable duration depending on the substitutions carried out in the material and thus permitting its use in cells, batteries, accumulators or supercapacitors.

In fact, its essential advantage is that it provides a material having short charging and discharging times, of the order of a few minutes, consequently permitting the development of possible substitutes for supercapacitors, possessing a very large quantity of electric charge in a minimum of time, an indispensable characteristic in particular for an electric car, in comparison with times of several days for lithium-ion batteries where we must be content with power batteries.

In an advantageous embodiment, the invention relates to the use of a material defined above, in which $A^{n-}$ represents $CO_3^{2-}$ leading to the following formula (III):

$$[Fe^{II}_{6(1-x)}Fe^{III}_{6x}O_{12}H_{2(7-3x)}]^{2+}[CO_3^{2-},3H_2O]^{2-} \qquad (III)$$

in which x is from 0 to 1.

By way of example, for carbonates when x=0, the hydrated ferrous hydroxy salt is the hydrated ferrous hydroxycarbonate of formula $[Fe^{II}_6O_{12}H_{14}]^{2+}[CO_3^{2-},3\ H_2O]^{2-}$.

By way of example, for carbonates when x=1, the ferric oxyhydroxy salt is the ferric oxyhydroxycarbonate of formula $[Fe^{III}_6O_{12}H_8]^{2+}[CO_3^{2-},3\ H_2O]^{2-}$.

The material of the invention in which $A^{n-}$ represents $CO_3^{2-}$ possesses a theoretical capacity of 245 Ah/kg, or 800 Ah/L.

Another advantage of the invention is therefore that it provides a material possessing short charging and discharging times, of the order of a few minutes, consequently making supercapacitors available possessing a very large quantity of electric charge in a minimum amount of time, an indispensable characteristic in particular for an electric car, in comparison with times of several days for lithium-ion batteries where we must be content with power batteries.

According to an advantageous embodiment, the available protons $H^+$ of the $OH^-$ groups of the material defined above are replaced partially or completely with monovalent cations, in particular $Li^+$, leading to a structure of the following general formula (IV) in the case of the carbonate in which the protons are replaced with lithium:

$$[Fe^{II}_{6(1-x)}Fe^{III}_{6x}O_{12}H_{2(7-3y)}Li^{I}_{6(y-x)}]^{2+}[CO_3^{2-},3H_2O]^{2-} \qquad (IV)$$

in which x is from 0 to 1 and $1 \geq y \geq x$

By "available protons" is therefore meant certain protons of the $OH^-$ groups surrounding the cations $Fe^{II}$ and $Fe^{III}$.

By the expression "replaced partially" is meant exchange of a proportion of the available protons, with a monovalent cation, for example lithium.

By "replaced completely" is meant complete exchange of the available protons $H^+$ with a monovalent cation such as lithium $Li^+$, i.e. y=1.

The partial or complete replacement of the protons of the $OH^-$ groups makes it possible to modify the charging and discharging times of the electrode thus leading to batteries for which the continuous availability of power is necessary, while preserving the electric charge capacity of the material.

Another benefit of this replacement is that it is possible to use a lithium counter-electrode at −3 V, as well as the corresponding electrolyte.

In an advantageous embodiment, the value of y in the aforementioned formula IV is preferably: y=⅓ or y=1.

In an advantageous embodiment, the $Fe^{II}$ present in the material can be replaced partially with divalent cations, in particular $Ni^{2+}$ and/or $CO_2^+$, leading to a structure of the following general formula (V) in the case of the carbonate in which the $Fe^{II}$ is replaced with $Ni^{2+}$ and the protons $H^+$ are not replaced:

$$[Fe^{II}_{6(1-y-x)}Ni^{II}_{6y}Fe^{III}_{6x}O_{12}H_{2(7-3x)}]^{2+}[CO_3^{2-},3H_2O]^{2-} \qquad (V)$$

in which x is comprised from 0 to 1 and $0 < y \leq 1-x$.

By the expression "replaced partially" is meant exchange of a proportion of the atoms of $Fe^{II}$ with a divalent cation such as nickel and/or cobalt from 1% to 50%, preferably from 1% to 40%, preferably from 1% to 30%, preferably from 1% to 20%, preferably from 1% to 10%, preferably from 1% to 5%, in particular 5%.

Consequently, the $Fe^{II}$ of the material of the invention can be replaced with a nickel atom, or with a cobalt atom or with both.

It is of course understood that when the $Fe^{II}$ is replaced, the hydrogen atom of the $OH^-$ groups can also be replaced with a monovalent cation.

The replacement of the $Fe^{II}$ atoms alone or of the $Fe^{II}$ atoms and hydrogen atoms makes it possible to alter the charging and discharging times of the electrode in different ways, thus leading to very varied uses of the electrodes constituted with the material of the invention.

It leads to a decrease in capacity, which will depend on the proportion of replacement of the $Fe^{II}$.

In an advantageous embodiment, the $Fe^{III}$ present in the material can be replaced partially or completely with trivalent cations, in particular $Al^{3+}$ and/or $Co^{3+}$, leading to a structure of the following general formula (VI) in the case of the carbonate in which the $Fe^{III}$ is replaced with $Al^{3+}$, and the $Fe^{II}$ and/or the protons $H^+$ are not replaced:

$$[Fe^{II}_{6(1-x)}Fe^{III}_{2(3x-z)}Al^{III}_{2z}O_{12}H_{2(7-3x)}]^{2+}[CO_3^{2-},3H_2O]^{2-} \qquad (VI)$$

in which x is from 0 to 1 and $0 < z \leq 3x$.

Consequently, the $Fe^{III}$ of the material of the invention can be replaced with an aluminium atom, or with a cobalt atom or with both.

The benefit of the replacement is in this case that it changes the electrode potential and/or the stability of the material.

Of course, when the $Fe^{III}$ is replaced, the $Fe^{II}$ atom can also be replaced as indicated above as well as the proton of the $OH^-$ groups as indicated above or just the $Fe^{II}$ atom can be replaced as indicated above or just the hydrogen atom of the $OH^-$ groups can be replaced as indicated above.

Replacement of the $Fe^{III}$ atoms and/or of the $Fe^{II}$ atoms and/or of the protons of the $OH^-$ groups can offer very varied charging and discharging times, suitable for many applications.

In an even more advantageous embodiment, the material defined above constitutes a cathode or an anode depending on the choice of a counter-electrode present in said energy storage device.

The operation of a cell, battery or supercapacitor requires the presence of an anode and a cathode.

The anode is the electrode at which an electrochemical reaction of oxidation takes place, leading to the production of electrons, and constitutes the negative pole of the storage device.

The cathode is the electrode at which an electrochemical reaction of reduction takes place, leading to the consumption of electrons, and constitutes the positive pole.

When the material of the invention is used as the anode, the counter-electrode is consequently the cathode, and vice versa.

By way of example, when the material of the invention is used as the cathode, the anode can then be constituted by, among others, a lithium electrode, or a platinum electrode.

When the material is used as the anode, the cathode is then constituted by other electrodes that are well known to a person skilled in the art and are usually employed for other types of material constituting the active electrodes.

Another advantage of the invention is therefore that it is possible to use the material either as cathode, or as anode depending on the energy storage device desired, by selecting the appropriate counter-electrode.

In an advantageous embodiment, said counter-electrode used with the material of the invention possesses an active redox couple having a potential difference greater than 1 V relative to the electrode containing said ferrous-ferric oxyhydroxy salt.

The advantage of having a PD greater than 1 V is the increase in power delivered. In fact, the greater the PD (U), the greater is the power that can be delivered, since $P=U\times I$.

Another advantage is limiting the number of cells for obtaining a voltage corresponding to the needs of existing electrical or electronic equipment.

According to an advantageous embodiment, said material defined above is used in the form of film deposited on a substrate, in particular a metallic substrate such as steel, copper or an oxide such as indium-doped tin oxide (ITO) or a substrate of carbon, in particular of graphite, and the thickness of the film deposited can vary between about 0.1 μm and 0.1 mm, preferably from a thickness of about 10 μm to a thickness of about 0.1 mm, in particular about 0.1 mm.

By the term "film" is meant a thin coating deposited on a substrate.

The substrate can be metallic such as steel or copper, or a tin oxide, or carbon such as graphite. The substrate is very important for the operation of the storage device since a film deposited on a substrate of gold or others does not give any signal in Mössbauer spectroscopy (FIG. 3).

FIG. 4b shows the voltamperometric curves obtained with a film of the invention containing 100 mg of material in the form of carbonate: $Fe^{III}_6O_{12}H_8CO_3$, i.e. $(GR(CO_3^{2-}))^*$ or GR*), as defined above and deposited on a substrate.

Another advantage of the invention is that an electrode can easily be constituted by simple deposition of a film of the invention on a substrate.

In an even more advantageous embodiment, the thickness of the film defined above is 10 μm, preferably 20 μm, even more preferably 30 μm, in particular 40 μm, in particular 50 μm, more preferably 60 μm, more preferably 70 μm, more preferably 80 μm, in particular 90 μm, in particular 100 μm.

According to an advantageous embodiment, said material defined above is used in the form of a composite and further comprises a binder such as oil or paraffin.

By "composite" is meant a mixture of carbon, in particular of graphite with the material of the invention.

By "binder" is meant a product that makes it possible to bind the graphite with the material of the invention to maintain the cohesion of the composite without masking a large part of the electrochemically active surface.

Several binders can be used, in particular polymers containing groups that give rise to chemical or hydrogen bonds, such as hydroxyl, carboxyl or amide groups.

Examples of binders, without being limited to these, are polytetrafluoroethylene (PTFE), polyvinylidene fluoride (PVDF), polyacrylonitrile (PAN), polyacrylic acid, polyacrylamide, elastomers such as styrene/butadiene (SBR) and acrylonitrile/butadiene (NBR) rubbers.

Preferably, the binders of the invention are selected from oil or paraffin.

FIG. 4a compares the voltamperometric curves obtained with a composite of the invention based on carbon and containing 100 mg of material in the form of carbonate (GR*, ferric oxyhydroxycarbonate) as defined above, and with pure carbon.

When the pure carbon electrode is used, no visible signal in the direction of reduction or of oxidation can be obtained whereas with the composite or the film of the invention a signal of large amplitude is obtained regardless of the direction (reduction or oxidation).

In an advantageous embodiment, the binder used in the material defined above is paraffin and said composite material comprises a carbon matrix mixed with the ferrous-ferric oxyhydroxy salt, the ferrous-ferric oxyhydroxy salt/carbon ratio (w/w) being from about 0.1 to about 100, preferably from about 0.1 to about 10, preferably from about 1 to about 10, and advantageously from 8 to 10, and the ferrous-ferric oxyhydroxy salt/paraffin ratio (w/w) being from about 1 to about 10, and advantageously from about 8 to about 10.

By the expression "carbon matrix" is meant a source of carbon in powder form, which can be graphite but is not limited thereto.

The proportion of the material of the invention relative to the carbon is important for the proper functioning of the electrode.

Below a ferrous-ferric oxyhydroxy salt/carbon ratio (w/w) of about 0.1, the material will no longer be functional.

In another embodiment, the ferrous-ferric oxyhydroxy salt/carbon ratio (w/w) defined above can be comprised from about more than 10 to about 100 and the material will have the same operating properties as when said ratio is ≤10 but will become more expensive to produce or will have lower mechanical strength.

Similarly, the proportion of the material of the invention relative to the binder, in particular paraffin, is also important for the proper functioning of the electrode.

Beyond a ferrous-ferric oxyhydroxy salt/paraffin ratio (w/w) equal to 0.1, excessive interaction of the binder with material leading to excessive coverage results in a decrease in active surface.

Beyond a ferrous-ferric oxyhydroxy salt/paraffin ratio (w/w) equal to 10, it no longer provides good adhesion of the polymer of the invention with the electrode.

According to a more advantageous embodiment, the binder used in the material defined above is oil and said composite material comprises a carbon matrix mixed with the ferrous-ferric oxyhydroxy salt, the ferrous-ferric oxyhydroxy salt/carbon ratio (w/w) being from about 0.1 to about 100, preferably from about 0.1 to about 10, preferably from about 1 to about 10, and advantageously from 8 to 10 and the ferrous-ferric oxyhydroxy salt/oil ratio (w/w) being from about 1 to about 10, and advantageously from about 8 to about 10.

As indicated above, the proportion of the material of the invention relative to the carbon and relative to the binder, in particular oil, is important for the proper functioning of the electrode.

In an advantageous embodiment, the invention relates to the use of a material defined above, in which the cell of said storage device comprises an electrolyte, in particular an acid such as sulphuric acid or hydrochloric acid in the case of carbonate or sulphate.

By "cell" is meant all of the various elements constituting the energy storage device.

By "electrolyte" is meant any substance or compound which, in the liquid state or in solution, or in the form of gel, permits the passage of electric current by movement of ions and in particular of protons.

According to an advantageous embodiment, the invention relates to the use of a material as defined above in which the potential difference (PD) of said cell of said storage device is from about 1V to about 4V, preferably from about 3V to about 4V, in particular 1.8V.

By "potential difference" is meant the voltage measured between the anode and the cathode.

If the PD is less than 1V, it is too low for powering electrical equipment.

Conversely, if it is too high, above 4V, it will not be able to be used in most of the existing electrical or electronic equipment that was designed for other types of cells or batteries.

The advantage of a voltage of 1.8 V is that it permits operation with most of the commonest existing electrical or electronic equipment.

According to another aspect, the invention relates to a film deposited on a substrate, in particular a metallic substrate such as steel, copper or an oxide such as indium-doped tin oxide (ITO) or a substrate of carbon, in particular of graphite and comprising at least one ferrous-ferric oxyhydroxy salt of general formula (I), (II), (III), (IV), (V) or (VI) defined above and, in which $A^{n-}$ is an anion of charge n, n having the values 1, 2 or 3, in particular 2, m is an integer in the range from 1 to 10, in particular from 1 to 4, advantageously 3, and x is from 0 to 1, and the thickness of the film deposited can vary between about 0.1 μm and 0.1 mm.

According to yet another aspect, the invention relates to a composite comprising at least one ferrous-ferric oxyhydroxy salt of general formula (I), (II), (III), (IV), (V) or (VI) defined above and,
in which $A^{n-}$ is an anion of charge n, n having the values 1, 2 or 3, in particular 2, m is an integer in the range from 1 to 10, in particular from 1 to 4, advantageously 3, and x is from 0 to 1.

According to an advantageous embodiment, the composite defined above further comprises a binder, in particular oil or paraffin.

According to a more advantageous embodiment, the invention relates to a composite defined above, in which said binder is paraffin and said composite material comprises a carbon matrix mixed with the ferrous-ferric oxyhydroxy salt, the ferrous-ferric oxyhydroxy salt/carbon ratio (w/w) being from about 0.1 to about 100, preferably from about 0.1 to about 10, preferably from about 1 to about 10, and advantageously from 8 to 10, and the ferrous-ferric oxyhydroxy salt/paraffin ratio (w/w) being from about 1 to about 10, and advantageously from about 8 to about 10.

In an even more advantageous embodiment, the invention relates to a composite defined above in which said binder is oil and said composite material comprises a carbon matrix mixed with the ferrous-ferric oxyhydroxy salt, the ferrous-ferric oxyhydroxy salt/carbon ratio (w/w) being from about 0.1 to about 100, preferably from about 0.1 to about 10, preferably from about 1 to about 10, and advantageously from 8 to 10 and the ferrous-ferric oxyhydroxy salt/oil ratio (w/w) being from about 1 to about 10, and advantageously from about 8 to about 10.

In an advantageous embodiment, the invention relates to a film or composite defined above, in which $A^{n-}$ represents $CO_3^{2-}$.

FIGS. 5, 6a and 6b compare the Mössbauer spectra obtained with a reference of GR*(1) (obtained by intensive oxidation of a ferrous-ferric hydroxycarbonate according to Example 2) and a material of the invention in the form of composite with 50 mg of GR*(1) (FIG. 6a) and 100 mg of GR*(1) (FIG. 6b) respectively.

The spectra obtained are similar whether it is the reference or composites, regardless of the amount of material used. Moreover, this indicates that even after redox cycles, the materials of the invention have properties similar to those that they possessed originally.

Table I gives the hyperfine parameters measured at ambient temperature for the two composites and the reference of GR*(1).

TABLE I

| Type of electrode | QS (mm/s) | IS (mm/s) | Γ (mm/s) |
|---|---|---|---|
| Reference GR*(1) | 0.70 | 0.26 | 0.25 |
| Composite carbon/50 mg GR*(1) | 0.70 | 0.26 | 0.23 |
| Composite carbon/100 mg GR*(1) | 0.70 | 0.26 | 0.24 |

QS: quadrupole splitting; IS: isomer shift; Γ: half-width of a peak at mid-height In an advantageous embodiment, the film or the composite defined above is used as cathode or anode of an energy storage device depending on the choice of counter-electrode.

In another aspect, the invention relates to an energy storage device such as a cell, battery, accumulator or supercapacitor comprising a cathode or an anode constituted by a film or by a composite defined above.

Consequently, another advantage of the invention is that it is possible to use the electrodes defined above for the application of storage devices such as cells, batteries, accumulators or supercapacitors having a theoretical capacity 50% greater than the theoretical capacity of the cells, batteries, accumulators or supercapacitors currently on the market, possessing a very fast charging and discharging rate of the order of a few minutes relative to the currently existing lithium-ion cells and constituted by non-polluting material that is easily disposable or recyclable.

According to an advantageous embodiment, the energy storage device such as a cell, battery, accumulator or supercapacitor as defined above, further comprises an electrolyte, in particular an acid such as sulphuric acid or hydrochloric acid in the case of the carbonate or the sulphate.

According to another aspect, the present invention relates to an energy storage device such as a cell, battery, accumulator or supercapacitor as defined above, comprising:
 a. an anode constituted by ferrous-ferric oxyhydroxy salt in which the anion is divalent, and is in particular sulphate ($SO_4^{2-}$) or carbonate ($CO_3^{2-}$),
 b. a cathode of metallic iron,
 c. an electrolyte, in particular in the form of gel or solution, at a pH below 5, in particular at a pH of 2 or 3.

The electrodes correspond to the Fe(0)/Fe(II) couple versus the Fe(II)/RV*Fe(III) couple in an acid electrolyte at around pH 2 (see FIGS. 7A and 7B).

According to yet another aspect, the present invention relates to a method of application of an energy storage device such as a cell, battery, accumulator or supercapacitor comprising a stage of protonation or deprotonation of the material defined above.

During deprotonation within the material, during which some $OH^-$ ions become $O_2^-$, there is loss of protons resulting from oxidation correlatively converting $Fe^{II}$ ions to $Fe^{III}$.

The material of the invention then constitutes an anode.

Conversely, during protonation within the material, during which some $O_2^-$ become $OH^-$ ions, then the $OH^-$ become $H_2O$, there is a gain of protons resulting from reduction, correlatively converting $Fe^{III}$ ions to $Fe^{II}$.

The material of the invention then constitutes a cathode.

In the case of batteries, accumulators or supercapacitors, these two functions alternate, depending on whether the device is delivering current or is being charged.

According to yet another aspect, the invention relates to a method of manufacture of a composite defined above, comprising the following stages:
 a. Mixing ferrous-ferric oxyhydroxy salt of general formula (I), (II), (III), (IV), (V) or (VI) defined above in a carbon matrix, to obtain a matrix-ferrous-ferric oxyhydroxy salt mixture,
 b. Heating said mixture with oil or paraffin at a temperature from about 30° C. to 90° C., preferably from about 45° C. to 80° C., preferably from about 60° C. to 70° C., in particular 60° C., to obtain a composite.

Heating with the oil or paraffin allows bonding to occur and makes it possible to shape the composite to the shape of the substrate of the electrode.

According to another aspect, the invention relates to a method of manufacture of a film as defined above, comprising a stage of deposition of the material, either chemical or electrochemical in the aqueous phase or by a dry process, or by "spindropping", The terms "chemical deposition", "electrochemical deposition", and "spindropping" are techniques well known to a person skilled in the art.

The method using chemical or electrochemical deposition gives a more stable film when it is dipped in a solution of electrolyte (0.04M $NaHCO_3$).

In another embodiment, the method of manufacture of a film, defined above, comprises the following stages:
 a. depositing a thin layer of thickness from about 0.1 µm to about 0.1 mm, preferably of thickness from about 10 µm to about 0.1 mm, in particular about 0.1 mm of ferrous-ferric oxyhydroxy salt of general formula (I), (II), (III), (IV), (V) or (VI) defined above, on a substrate as defined above, to obtain a supported ferrous-ferric oxyhydroxy salt,
 b. drying of the product obtained in the preceding stage at a temperature from about 15° C. to 40° C., preferably from about 20° C. to 30° C., in particular from about 20° C. to about 25° C., to obtain a film.

The y-axis corresponds to the percentage transmittance and the x-axis corresponds to the velocity in mm/s.

Figure 1A:
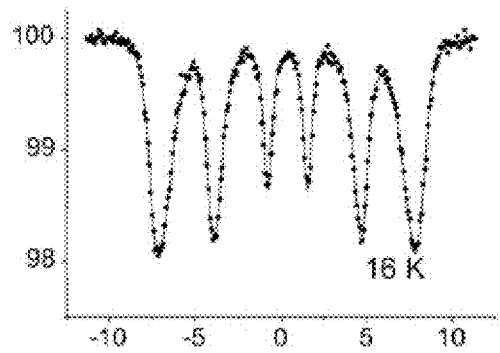
FIGS. 1 a-d show the Mössbauer spectra obtained respectively at a temperature of 16, 50, 60 and 78 K with the material (GR*), ferric oxyhydroxycarbonate of formula $[Fe^{III}_6O_{12}H_8]^{2+}CO_3^{2-}$ and prepared by intensive oxidation, with $H_2O_2$, of the ferrous-ferric hydroxycarbonate $[Fe^{II}_4Fe^{III}_2(OH)_{12}]^{2+}CO_3^{2-}$ of Example 2.
Figure 1B:
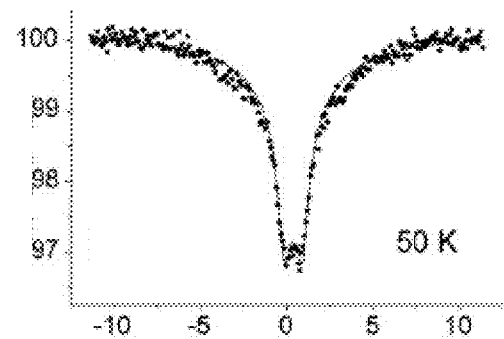
Figure 1C:
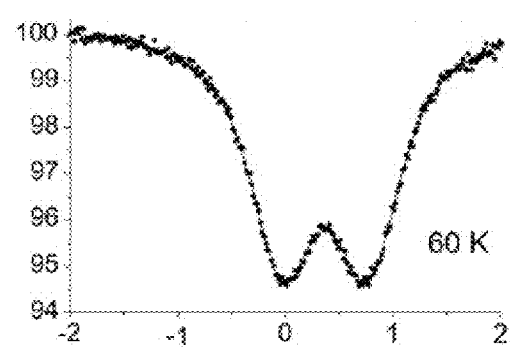
Figure 1D:
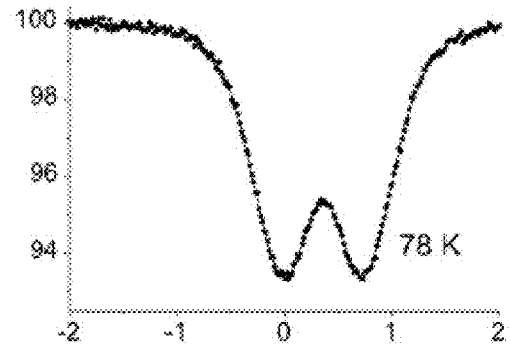
Figure 2:
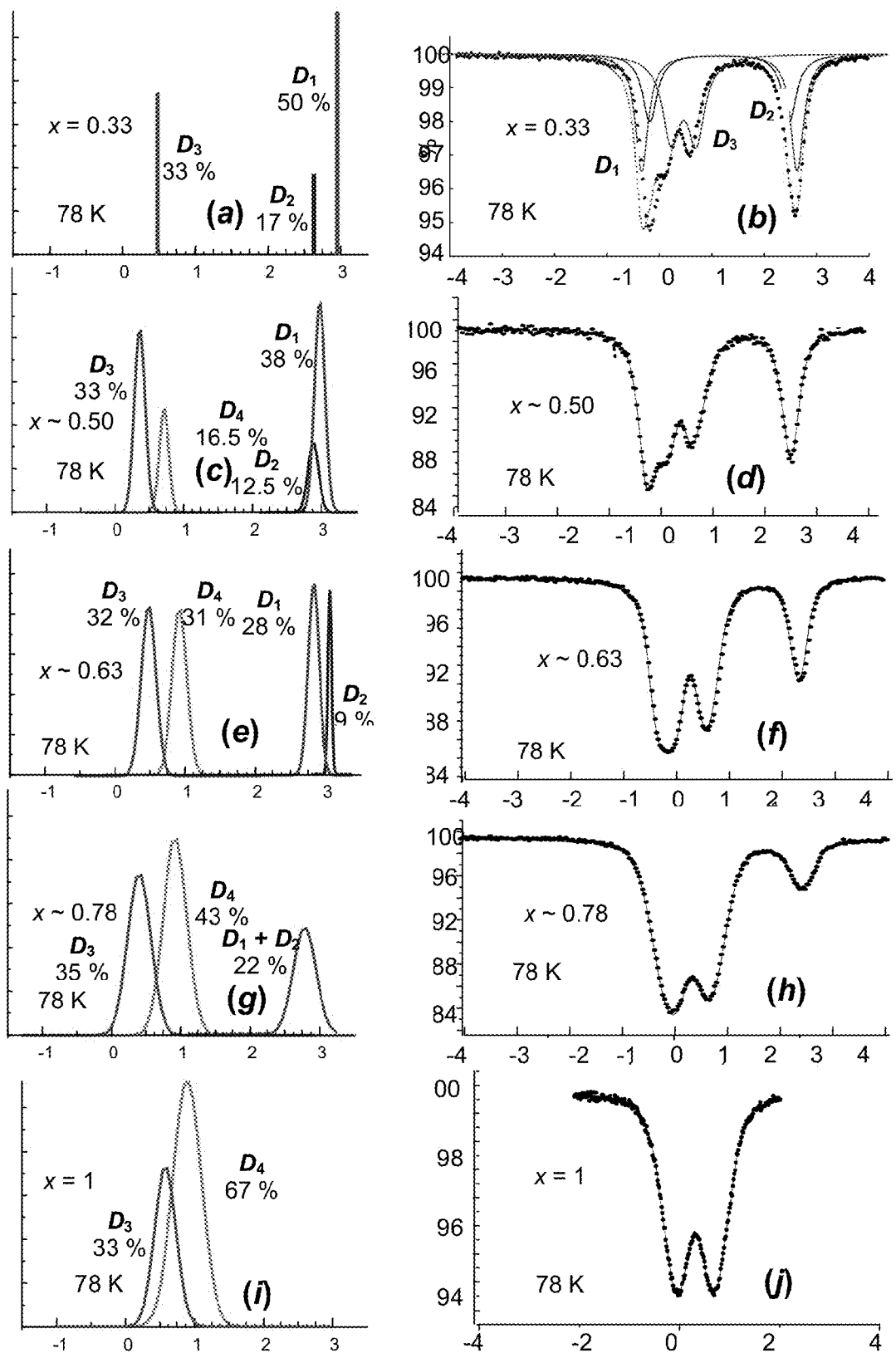

FIGS. 2 b, d, f, h, j show the Mössbauer spectra measured at 78 K for samples of ferrous ferric oxyhydroxycarbonate $Fe^{II}_{6(1-x)}Fe^{III}_{6x}O_{12}H_{2(7-3x)}CO_3$ on varying x (FIG. 2b: x=0.33; FIG. 2d: x=0.50; FIG. 2f: x=0.63; FIG. 2h: x=0.78; FIG. 2j: x=1.

The y-axis corresponds to the percentage transmittance and the x-axis corresponds to the velocity in mm/s.

FIGS. 2a, c, e, g, i show the deconvolutions of the relevant spectra, b, d, f, h, j: the relative abundances of components are indicated.

Figure 3:
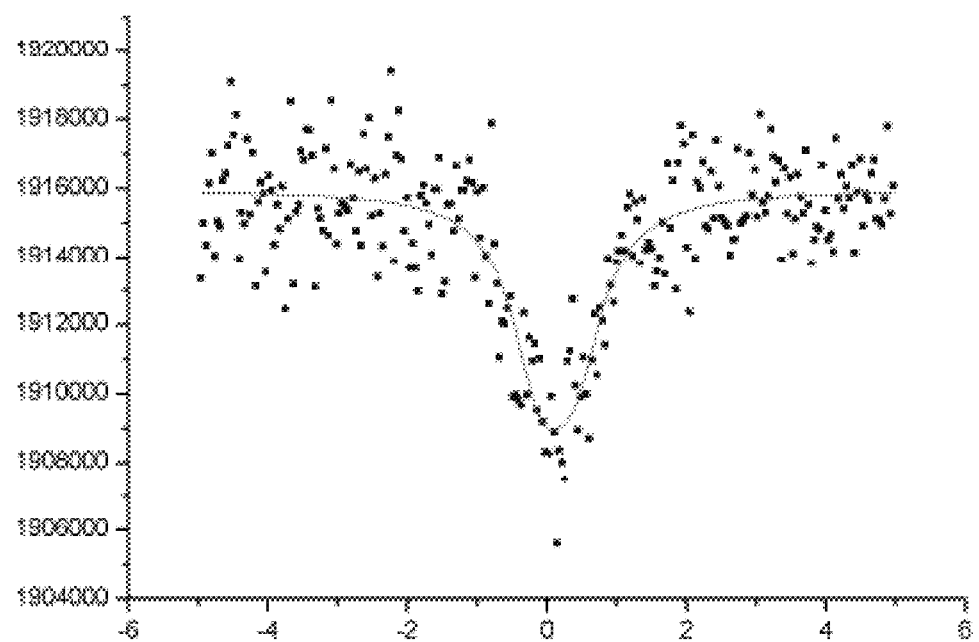

FIG. 3 shows the Mössbauer spectrum obtained at ambient temperature with the material of the invention (GR*) in the form of film deposited on a gold substrate.

The y-axis corresponds to the intensity in arbitrary units and the x-axis corresponds to the velocity in mm/s.

FIGS. 4a-b show the voltamperometric curves obtained from the material GR*, ferric oxyhydroxycarbonate, $[Fe^{III}_6O_{12}H_8]^{2+}[CO_3^{2-},3H_2O]^{2-}$ in various forms at 100 mg of GR*.

FIG. 4a shows the curve obtained with a composite of GR* with carbon (solid line) from Example 3 or a reference of carbon alone (dotted lines).

The y-axis corresponds to the current obtained in µA and the x-axis corresponds to the potential in volts.

FIG. 4b shows the curve obtained with a film of GR* from Example 4 (solid lines and dotted lines corresponding to two cycles).

The y-axis corresponds to the current obtained in µA and the x-axis corresponds to the potential in volts.

Figure 5:
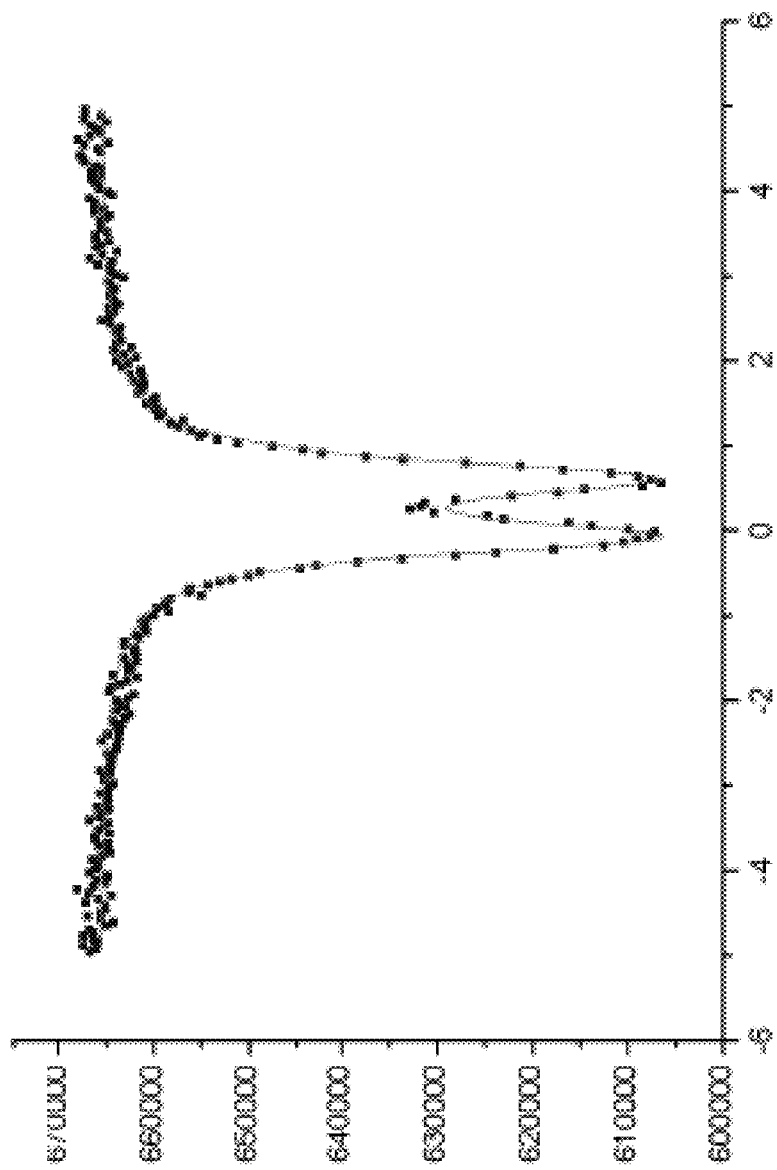

FIG. 5 shows the Mössbauer spectrum obtained with the reference material of the invention (GR*).

The y-axis corresponds to the intensity in arbitrary units and the x-axis corresponds to the velocity in mm/s.

Figures 6A, 6B:
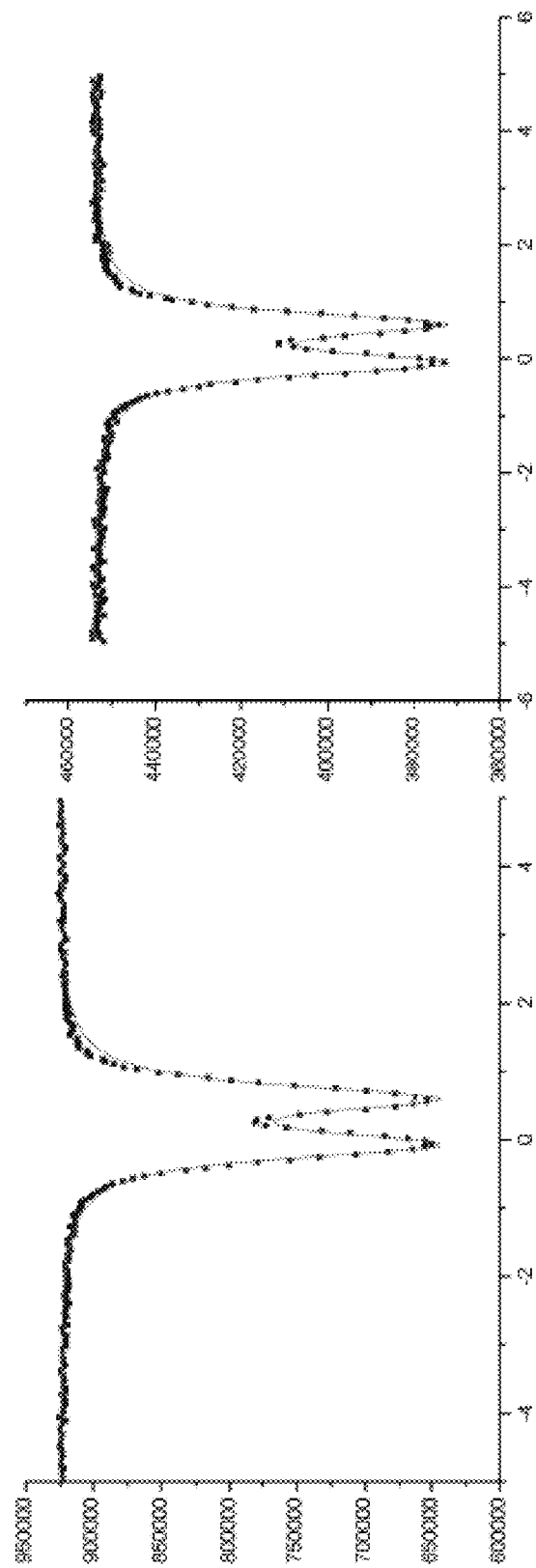

FIGS. 6a-b show the Mössbauer spectrum obtained with the material of the invention (GR*) in the form of composite.

FIG. 6a corresponds to the carbon composite with 50 mg of GR*.

The y-axis corresponds to the intensity in arbitrary units and the x-axis corresponds to the velocity in mm/s.

FIG. 6b corresponds to the carbon composite with 100 mg of GR*.

The y-axis corresponds to the intensity in arbitrary units and the x-axis corresponds to the velocity in mm/s.

Figure 7A:
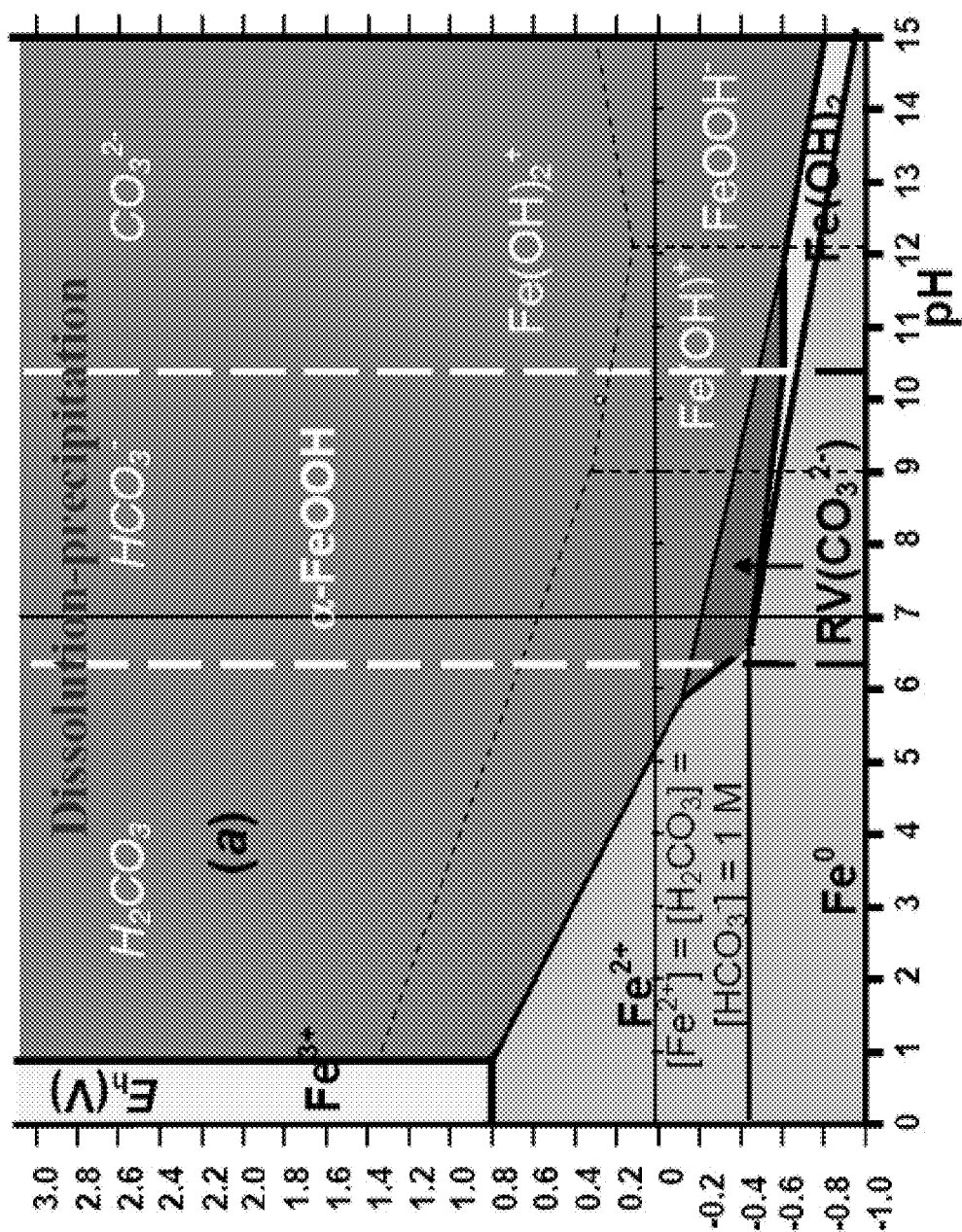
Figure 7B:
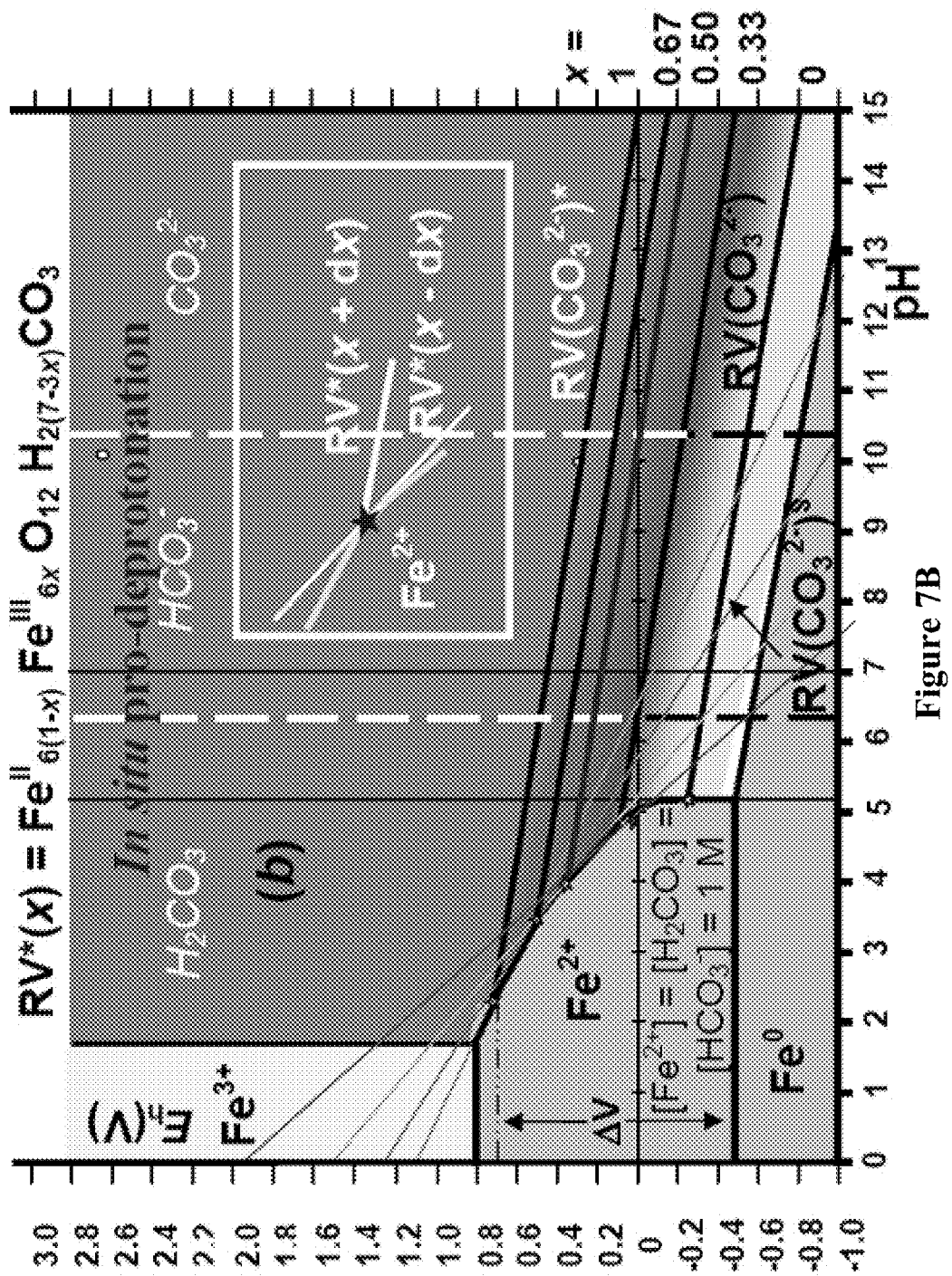

FIGS. 7A and 7B show the so-called Pourbaix diagram Eh-pH of all of the compositions of the ferrous-ferric oxyhydroxycarbonate RV*(x) (or GR*(x)) of general formula $Fe^{II}_{6(1-x)}Fe^{III}_{6x}O_{12}H_{2(7-3x)}CO_3$. The Pourbaix diagram is constituted by a set of parallel straight lines of slope −0.0591 (Nernst law). It can be compared to that of stoichiometric green rust RV (or GR), used in the corrosion of ferrous materials.

FIG. 7A shows the Pourbaix diagram of the hydroxycarbonate $Fe^{II-III}$, $[Fe^{II}_4Fe^{III}_2(OH)_{12}]^{2+}[CO_3^{2-},3H_2O]^{2-}$ in dissolution-precipitation mode.

In a usual corrosion process, the layer of green rust RV dissolves at the end of aqueous oxidation and is reprecipitated in the form of iron oxide hydroxide, FeOOH, which depending on the medium can be goethite α-FeOOH, lepidocrocite γ-FeOOH, ferrihydrite δ'-FeOOH or akaganeite β-FeOOH. The domain of RV is certainly limited, but on examining all of the domains of $Fe(OH)_2$, RV and $Fe^{II}$ (FIG. 7A), all the pH values are involved and dissolution of RV leads to corrosion of the ferrous material. Even if it is slow, it is inevitable whatever the pH.

FIG. 7B shows the Pourbaix diagram of the oxyhydroxycarbonate $Fe^{II-III}$, $Fe^{II}_{6(1-x)}Fe^{III}_{6x}O_{12}H_{2(7-3x)}CO_3$ in in-situ deprotonation mode. A contrario, if rapid oxidation is provided by deprotonation in situ, for example with $H_2O_2$, drying then exposure to the air, basic solution, placing under voltage (voltamperometer), intensive oxygenation, the active material RV*(x) is made structurally durable. The diagram (FIG. 7B) shows that it corresponds to a wide domain as long as the pH of the solution exceeds 5 and the transition that corresponds to all of the Nernst straight lines over the full range of charging and discharging, from the ferrous compound $RV(CO_3^{2-})§$, $Fe^{II}_6O_{12}H_{14}CO_3$, to the ferric $RV(CO_3^{2-})*$, $Fe^{III}_6O_{12}H_8CO_3$. At pH 7, the voltage range is from about −0.5 to +0.6 V (standard hydrogen reference electrode).

EXAMPLES

Example 1

Mössbauer Spectroscopy

Mössbauer reflection spectroscopy using the MIMOS instrument was used for determining the oxidation state of the iron in the composites and the films. The MIMOS instrument operates by backscattering geometry for detecting reemitted radiation (14.4 keV for gamma rays and 6.4 keV for X-rays). MIMOS is also used for studying iron compounds present on the soil of the planet Mars. (NASA and European Space Agency)

The Mössbauer spectra were calibrated using a sheet of iron at ambient temperature and were adjusted with lines of Lorentzian shape and a single ferric quadrupole doublet.

Example 2

Preparation of the Material

The stoichiometric ferrous ferric hydroxycarbonate $[Fe^{II}_4 Fe^{III}_2(OH)_{12}]^{2+}CO_3^{2-}$-$GR(CO_3^{2-})$ is prepared by chemical synthesis, either by oxidation of a precipitate of $Fe(OH)_2$ in the presence of carbonate ions as described by Génin et al. (2006, Geoscience), or by co-precipitation of the $Fe^{II}$ and $Fe^{III}$ ions in the presence of anions as described by Ruby et al. (2006, Geoscience).

This ferrous-ferric hydroxycarbonate is then deprotonated completely with a powerful oxidant such as $H_2O_2$ in excess (GR* (1)) or in air after drying (GR* (2)), as described in Génin et al. (2006, Geoscience) to form the ferric oxyhydroxycarbonate of formula $[Fe^{III}_6 O_{12}H_8]^{2+}CO_3^{2-}$(GR*(1) or (2)).

The product obtained is characterized by X-ray diffraction, Mössbauer spectrometry, vibration spectrometry (Raman or infrared) and transmission electron microscopy.

The Mössbauer parameters of $GR(CO_3^{2-})$ and GR* are presented below in Table II:

Example 3

Preparation of the Composites

The oxyhydroxycarbonate (GR*(1)) and the carbon powder are mixed with paraffin or oil as binder. In the case of paraffin, the composites are made by mixing 250 mg of carbon and 50 or 100 mg of GR*(1), then the mixture is heated in the presence of 100 mg of paraffin to bind the whole.

The Mössbauer spectra of the composites obtained with 50 or 100 mg of GR*(1) (FIGS. 6A and 6B) are comparable to that of GR*(1).

Example 4

Preparation of the Films

The thin films of GR*(1) were prepared on carbon substrates or metallic substrates or substrates of oxide such as indium-doped tin oxide (ITO) by chemical or electrochemical deposition of a fine sediment and then drying at 60° C. or by "spindropping" of a fine sediment and then drying at ambient temperature.

Example 5

Electrochemical Investigations

The voltamperometric curves of the composites and of the films were obtained using these materials as working electrode. An Ag/AgCl electrode was used as reference electrode for characterization of the composites and a pseudo-reference was used for the films. These electrodes were kept in contact with a 0.04M solution of $NaHCO_3$. The solution pH was buffered at 8-9 with carbonate. The electrochemical investigations were carried out on an Autolab PGSTAT12 potentiostat controlled with PGES software for voltage scanning.

TABLE II

Mössbauer parameters of $GR(CO_3^{2-})$, GR*(1) obtained by intensive oxidation of $GR(CO_3^{2-})$ and GR*(2) obtained by oxidation in air by drying of $GR(CO_3^{2-})$.

| Sample | T (K) | | δ (mm s$^{-1}$) | (Δ) or ε (mm s$^{-1}$) | (δΔ) (mm s$^{-1}$) | (H) (kOe) | (δH) (kOe) | RA % |
|---|---|---|---|---|---|---|---|---|
| $GR(CO_3^{2-})$ | 12 K | $D_1$ | 1.29 | 2.91 | | | | 49 |
| | | $D_2$ | 1.29 | 2.57 | | | | 19 |
| | | $D_3$ | 0.50 | 0.40 | | | | 32 |
| GR*(1) | 16 K | $S_1$ | 0.48 | ~0.00 | | 447 | 25 | 51 |
| | | $S_2$ | 0.48 | ~0.00 | | 401 | 42 | 15 |
| | | $S_3$ | 0.48 | ~0.00 | | 480 | 16 | 34 |
| | 78 K | $D_1$ | 0.47 | 0.88 | 0.41 | | | 67 |
| | | $D_3$ | 0.47 | 0.60 | 0.30 | | | 33 |
| GR*(2) | 16 K | $S_1$ | 0.48 | ~0.00 | | 477 | 21 | 70 |
| | | $S_3$ | 0.48 | ~0.00 | | 440 | 37 | 30 |
| | 10 K | D | 0.47 | 0.77 | 0.22 | | | 100 |

δ: isomer shift
Δ and δΔ: quadrupole splitting and standard deviation
ε: quadrupole shift
Table II shows that $GR(CO_3^{2-})$ is paramagnetic below 12 K. Its Mössbauer spectrum has three doublets at 12 K ($D_1$, $D_2$ and $D_3$). $D_1$ and $D_2$ correspond to the $Fe^{II}$ ions and $D_3$ corresponds to the $Fe^{III}$ ions.
GR*(1) obtained by intensive oxidation has no trace of $Fe^{II}$ ions confirming the complete oxidation of $GR(CO_3^{2-})$.
GR*(2) obtained by oxidation in air also has no trace of $Fe^{II}$ ions.
The Mössbauer spectra of (GR* (1) obtained at 16 K, 50 K, 60 K and 78 K are shown in FIGS. 1a, 1b, 1c and 1d.

Example 6

Preparation of a Cell

A battery according to the diagram in FIG. 7B was developed.
The cathodic reduction (+ terminal of the battery) corresponds to the reaction:
$Fe^{III}_6O_{12}H_8CO_3 + 6e^- + 6H^+ \rightarrow Fe^{II}_6O_{12}H_{14}CO_3$.

At the anode, metallic iron is in equilibrium with the $Fe^{2+}$ ions in solution:

$$Fe^0 \rightarrow Fe^{2+} + 2e^-$$

The electrolyte is an acid solution of pH below 5, preferably 2 (for example sulphuric acid or hydrochloric acid).

The theoretical specific electrical energy capacity of this cell is about 245 Ah/kg. At a pH of 2, FIG. 7 shows a value of Eh equal to 1.2 V between a counter-electrode of metallic iron and RV*(or GR*), which leads to a power of about 300 Wh/kg.

This type of battery is therefore very competitive relative to lead batteries and makes it possible to obtain, with 10 cells, a 12V battery.

Another advantage of the material of the invention is that it makes it possible to manufacture batteries weighing five times less than lead batteries.

The invention claimed is:

1. A material for an electrode of an energy storage device having a theoretical electrical energy capacity greater than or equal to 160 Ah/kg, the material comprising at least one compound related to a ferrous-ferric layered double hydroxide (LDH),
said at least one compound comprising at least one divalent cation $D^{II}$ and at least one trivalent cation $T^{III}$ of general formula (I):

$$[D^{II}_{3n(1-x)}T^{III}_{3nx}O_{6n}H_{(7-3x)}]^{n+}[A^{n-}, m\,H_2O]^{n-} \quad (I)$$

wherein $A^{n-}$ is an anion of charge n, n having the values 1, 2 or 3,
m is an integer in the range from 1 to 10, and
x is from 0 to 1, excluding 1,
wherein said at least one compound comprises a minimum amount of $Fe^{II}$ of 1%, permitting conversion of $Fe^{II}$ to $Fe^{III}$.

2. The material according to claim 1, wherein the material comprises at least one compound of ferrous-ferric oxyhydroxy salt of general formula (II):

$$[Fe^{II}_{3n(1-x)}Fe^{III}_{3nx}O_{6n}H_{(7-3x)}]^{n+}[A^{n-}, mH_2O]^{n-} \quad (II)$$

wherein $A^{n-}$ is an anion of charge n, n having the values 1, 2 or 3,
m is an integer in the range from 1 to 10, and
x is from 0 to 1, excluding 1,
it being possible for said ferrous-ferric oxyhydroxy salt to be partially modified by a partial or complete replacement of at least one of its elements.

3. The material according to claim 2, wherein $A^{n-}$ represents $CO_3^{2-}$ leading to the formula (III):

$$[Fe^{II}_{6(1-x)}Fe^{III}_{6x}O_{12}H_{2(7-3x)}]^{2+}[CO_3^{2-}, 3H_2O]^{2-} \quad (III)$$

in which x is from 0 to 1, excluding 1.

4. The material according to claim 2, wherein $A^{n-}$ represents $CO_3^{2-}$ and the available protons $H^+$ of the $OH^-$ groups are partially or completely replaced with monovalent cations, to give a structure of general formula (IV) in the case of the carbonate in which the protons are replaced with lithium:

$$[Fe^{II}_{6(1-x)}Fe^{III}_{6x}O_{12}H_{8+6(1-y)}Li^{I}_{6(y-x)}]^{2+}[CO_3^{2-}, 3H_2O]^{2-} \quad (IV)$$

in which x is from 0 to 1, excluding 1, and $1 \geq y \geq x$.

5. The material according to claim 4, wherein said monovalent cations are $Li^+$.

6. The material according to claim 2, wherein $A^{n-}$ represents $CO_3^{2-}$ and the $Fe^{II}$ is partially replaced with divalent cations.

7. The material according to claim 6, wherein said divalent cation is $Ni^{2+}$ and/or $Co^{2+}$ to give a structure of general formula (V) in the case of the carbonate in which the $Fe^{II}$ is replaced with $Ni^{2+}$ and the protons $H^+$ are not replaced:

$$[Fe^{II}_{6(1-y-x)}Ni^{II}_{6y}Fe^{III}_{6x}O_{12}H_{2(7-3x)}]^{2+}[CO_3^{2-}, 3H_2O]^{2-} \quad (V)$$

in which x is from 0 to 1, excluding 1, and $0 < y \leq 1-x$.

8. The material according to claim 2, wherein $A^{n-}$ represents $CO_3^{2-}$ and the $Fe^{III}$ is partially or completely replaced with trivalent cations.

9. The material according to claim 8, wherein said trivalent cation is $Al^{3+}$ and/or $Co^{3+}$ to give a structure of general formula (VI) in the case of the carbonate in which the $Fe^{III}$ is replaced with $Al^{3+}$, and the $Fe^{II}$ and/or the protons $H^+$ are not replaced:

$$[Fe^{II}_{6(1-x)}Fe^{III}_{2(3x-z)}Al^{III}_{2z}O_{12}H_{2(7-3x)}]^{2+}[CO_3^{2-}, 3H_2O]^{2-} \quad (VI)$$

in which x is from 0 to 1, excluding 1, and $0 < z \leq 3x$.

10. The material according to claim 2, wherein said material is in the form of a composite material, and further comprises a binder of oil or paraffin.

11. The material according to claim 10, wherein said binder is paraffin, and said composite material comprises a carbon matrix mixed with a ferrous-ferric oxyhydroxy salt, the ferrous-ferric oxyhydroxy salt/carbon ratio (w/w) being from about 0.1 to about 100, and the ferrous-ferric oxyhydroxy salt/paraffin ratio (w/w) being from about 1 to about 10.

12. The material according to claim 10, wherein said binder is oil and said composite material comprises a carbon matrix mixed with the ferrous-ferric oxyhydroxy salt, the ferrous-ferric oxyhydroxy salt/carbon ratio (w/w) being from about 0.1 to about 100, and the ferrous-ferric oxyhydroxy salt/oil ratio (w/w) being from about 1 to about 10.

13. The material according to claim 1, wherein the theoretical electrical energy capacity of said electrode is equal to 245 Ah/kg, and n is 2, and m is 3.

14. The material according to claim 1, wherein said material constitutes a cathode or an anode configured to be associated with a corresponding counter-electrode present in the energy storage device.

15. The material according to claim 14, wherein said counter-electrode possesses an active redox couple having a potential difference greater than 1 V relative to the electrode containing said ferrous-ferric oxyhydroxy salt.

16. The material according to claim 1, wherein said material is in the form of a film deposited on a metallic substrate of steel, copper, or an oxide thereof, or on a substrate of carbon, the film having a thickness of between about 0.1 μm and 0.1 mm.

17. The material according to claim 1, wherein $A^{n-}$ represents carbonate or sulphate and a cell of said storage device comprises an acid electrolyte of sulphuric acid or hydrochloric acid.

18. The material according to claim 17, wherein the potential difference (PD) of said cell of said storage device is from about 1 V to about 4 V.

19. The material according to claim 1, wherein
$D^{II}$ is selected from the group consisting of $Mg^{II}$, $Ni^{II}$, $Ca^{II}$, $Mn^{II}$, $Co^{II}$ and $Fe^{II}$, and
$T^{III}$ is selected from the group consisting of $Al^{III}$, $Co^{III}$, $Cr^{III}$ and $Fe^{III}$.

20. An electrode for an energy storage device, comprising the material according to claim 1.

21. The electrode according to claim 20, wherein said energy storage device is an electric cell, a battery, an accumulator, or a supercapacitor.

22. A film deposited on a metallic substrate of steel, copper or an oxide thereof, or on a substrate of carbon, the film comprising the at least one compound of general formula (I), defined in claim 1, the thickness of the film being between about 0.1 µm and 0.1 mm.

23. The film according to claim 22, wherein $A^{n-}$ represents $CO_3^{2-}$.

24. The film according to claim 22, configured to be used as cathode or anode of an energy storage device.

25. An energy storage device comprising the cathode or anode according to claim 24.

26. The energy storage device according to claim 25, further comprising an acid electrolyte of sulphuric acid or hydrochloric acid.

27. The energy storage device according to claim 26 the acid electrolyte is in the form of a gel or a solution, at a pH below 5.

28. A composite comprising the at least one compound of general formula (I), defined in claim 1.

29. The composite according to claim 28, further comprising a binder of oil or paraffin.

30. The composite according to claim 29, wherein said binder is paraffin and said composite material comprises a carbon matrix mixed with the ferrous-ferric oxyhydroxy salt, the ferrous-ferric oxyhydroxy salt/carbon ratio (w/w) being from about 0.1 to about 100, and the ferrous-ferric oxyhydroxy salt/paraffin ratio (w/w) being from about 1 to about 10.

31. The composite according to claim 29, wherein said binder is oil and said composite material comprises a carbon matrix mixed with the ferrous-ferric oxyhydroxy salt, the ferrous-ferric oxyhydroxy salt/carbon ratio (w/w) being from about 0.1 to about 100, and the ferrous-ferric oxyhydroxy salt/oil ratio (w/w) being from about 1 to about 10.

* * * * *